United States Patent Office 2,758,927
Patented Aug. 14, 1956

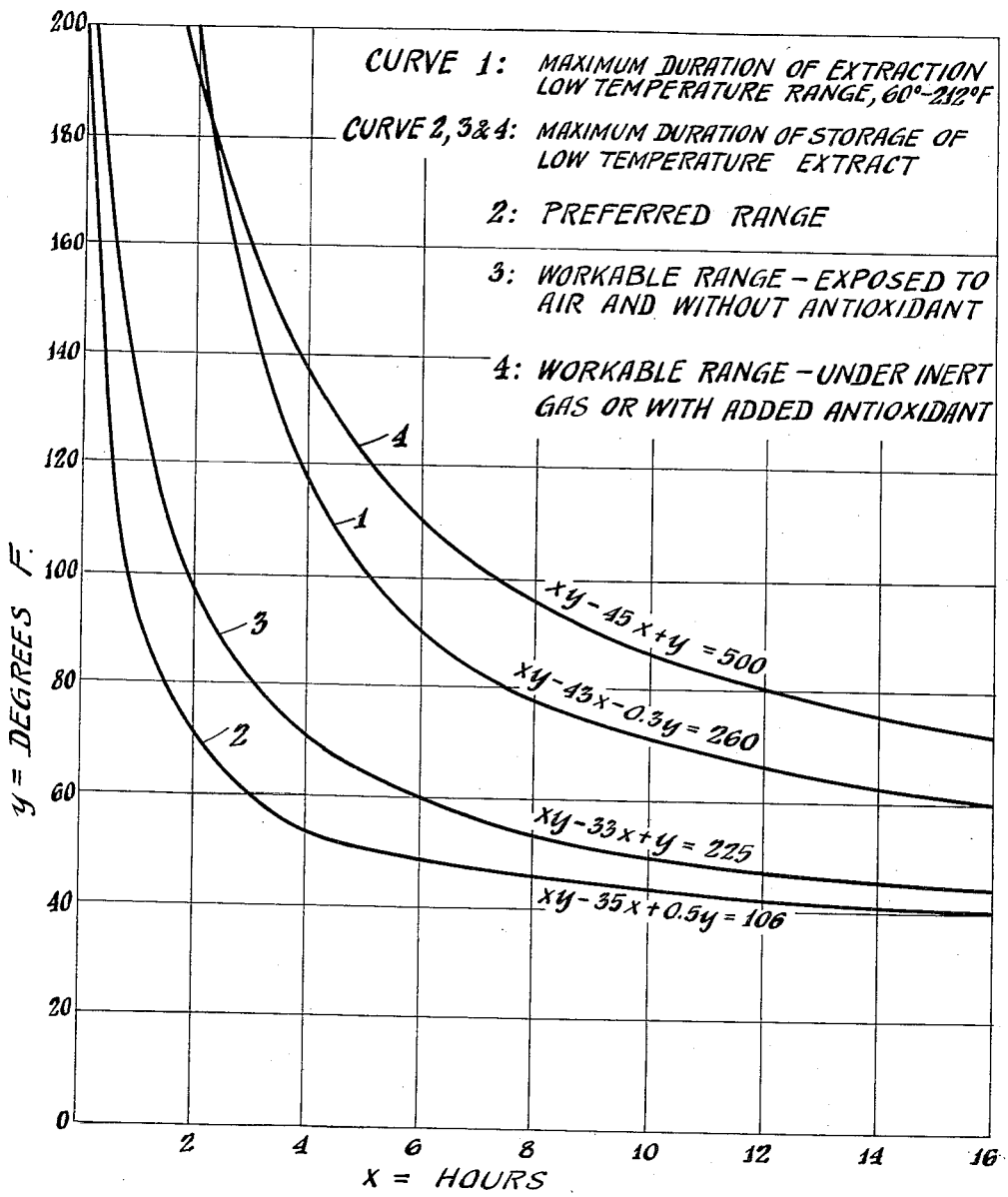

2,758,927
PROCESS OF MAKING SOLUBLE COFFEE CONCENTRATE

Fletcher A. Chase, Morris Plains, N. J., assignor, by mesne assignments, to American Home Products Corporation, New York, N. Y., a corporation of Delaware Application February 18, 1953, Serial No. 337,523

2 Claims. (Cl. 99—71)

This invention relates to an improved solid soluble coffee concentrate and a process of making it in which ground raw coffee is extracted, the extract evaporated, and the extract residue roasted.

In making all the commercially successful solid coffee concentrates now on the market, ground roasted coffee is extracted with water by one or another of available processes and the extract evaporated to dryness. Many variations of these steps have been developed in an effort to improve flavor and aroma, to increase yield and to introduce economies into the process. None has been entirely satisfactory in all respects. During all extractions of roasted coffee there is a significant loss of flavor and aroma and a further loss of flavor and aroma during drying.

Early in this development the thought was advanced that loss of aroma during extraction and evaporation of the extract might be avoided by extracting green coffee instead of roasted coffee, evaporating the extract before the development of the aromatic constituents in volatile form, and finally roasting the solid residue resulting from the evaporation to develop flavor and aroma. This concept appears fundamentally sound, but apparently insuperable difficulties have hitherto been encountered in its practical realization.

One of the early workers in this field was Von Vietinghoff. In U. S. Patent 1,175,091 issued to him in 1916 for a different method of preparing a soluble solid coffee extract, he detailed reasons for the failure of what I call for short the raw-bean process, i. e. broadly, the process in which the beans are extracted before roasting. Von Vietinghoff said, "the practical difficulties encountered make the process inoperable." These difficulties were: (1) that some of the substances dissolved from the raw beans become insoluble on roasting the solid evaporated extract, thus leaving a residue when coffee beverage is made from the extract; (2) difficulty is encountered in evaporating the extract of the raw beans due to foaming and high viscosity "owing to its content of albumen"; (3) difficulty is encountered in roasting the resulting extract "in an approximately homogeneous manner."

Later L. G. Copes and associates attacked the problem by introducing modifications into the step of extracting the raw beans. In U. S. Patent 1,932,769, issued in 1933, Copes, Haurand and Kellogg disclose a process in which insoluble materials (apparently those referred to by Von Vietinghoff) are eliminated "by preheating the green coffee, or an extract thereof, to a suitable temperature, considerably lower than the temperature to which coffee is ordinarily roasted. . . ." According to these patentees, for example, ground green coffee may be boiled in water long enough to make the deleterious materials insoluble, the extract filtered and evaporated, and the residue roasted. Or, alternatively, the ground green coffee may be extracted at a lower temperature and the extract boiled, filtered, and worked up. Or the ground green coffee may be steamed before extraction.

In U. S. Patent 1,933,049, also issued in 1933, Copes discloses a modified process in which ground green coffee is mixed with twice its weight of "cold water" and "allowed to stand for twelve hours," after which the liquid is pressed out. The solid residue is then treated with boiling water for about 10 minutes and the liquid pressed out; this step may be repeated. The hot and cold extracts are united and evaporated to dryness, either under vacuum or atmospheric pressure, and the residue roasted.

Neither of these processes produces a solid soluble coffee concentrate of a quality to satisfy the present highly educated public taste, and neither has, as far as I know, been successfully exploited commercially.

It is one object of my invention to produce a solid soluble coffee concentrate of superior taste and aroma.

It is another object of my invention to produce a residue of green-coffee extract that may be converted to such a concentrate by roasting.

It is a further object of my invention to provide a process for the above purposes that is economical and that may be carried out for the most part in conventional equipment.

Other purposes and advantages of my invention will be apparent to those skilled in the art from the following disclosure.

I have discovered that when ground green coffee is subjected to a low-temperature extraction, the low-temperature extract is extremely unstable and immediately shows signs of decomposition, apparently due to enzymes extracted from the green coffee. Such low-temperature extraction, however, is necessary to obtain the aroma-yielding constituents of the coffee. A high-temperature extraction may advantageously supplement the low-temperature extraction to obtain an economical yield from the coffee beans and to impart body to the flavor of the final product. However, the high-temperature extraction, while desirable for producing an optimum product complete in itself, is not essential, especially when the product is to be blended with a conventional solid soluble coffee concentrate to impart improved aroma and flavor. I have found that my process, as disclosed and claimed below, produces a product of exceptionally high quality and utility, and that in its practice the difficulties encountered in prior processes are substantially eliminated.

According to one embodiment of my process, therefore, I first extract the ground raw coffee beans at a relatively low temperature and evaporate the extract under such conditions as to avoid the above mentioned decomposition, which is very deleterious to the quality of the final product, and then extract the thus partially extracted raw coffee at a higher temperature. Finally I evaporate the extracts to dryness and roast the residue, producing a solid soluble concentrate which, alone or blended with conventional concentrates, produces a superior beverage when dissolved in water.

Prior to extraction, the raw beans are ground. The size of the granules is not critical, but I have had good results by grinding to such a fineness that 100% passes a 3 mm. screen and 75% is retained by a 0.5 mm. screen.

The low-temperature extraction may be carried out at a wide range of temperatures—e. g. 60°–212° F.—but I prefer to work in the range 60°–100° F. The extraction may be carried out by agitating the ground raw coffee with water at the desired temperature, or by circulating water at the desired temperature through a mass of the ground raw coffee, or by making the low-temperature extraction the last stage in a continuous multi-stage countercurrent process in which hot water is brought into contact with nearly exhausted coffee in the first stage and leaves the system at a low temperature after contact with fresh unextracted raw coffee. The low-temperature extraction may even be carried out in whole or in part by grinding the raw coffee in the presence of water. In all these extraction modifications, dilute ethanol, up to 50% by volume, may be used instead of water. There is thus a wide range of conditions under which this phase of my process can be operated.

There is, however, a critical limitation in carrying out the low-temperature extraction and evaporation, conditioned by the need of avoiding the above mentioned deleterious decomposition of the extract. I have found that this can be avoided (a) by limiting the duration of the extraction, and (b) by evaporating the extract rapidly and immediately after completing the extraction. Alternatively (b'), if it is necessary to delay the evaporation, the extract may be stored a limited time without serious deterioration by refrigerating to a low temperature, viz. 32°–50° F. Deterioration is slower at low temperatures, and is less in the absence of air, e. g. under a blanket of inert gas such as $CO_2$ or $N_2$. The addition of antioxidants will also retard deterioration.

The maximum duration of the low-temperature extraction step at various temperatures, within which the advantages of my invention may be realized, may be expressed empirically by a hyperbolic equation $$xy - 43x - 0.3y = 260 \qquad (1)$$

in which $x$ represents the duration in hours and $y$ the temperature of the extraction in degrees F., the values of $x$ being not over 16 and those of $y$ being in the range 60–212. Owing to the natural variation in properties of coffee, this equation does not have the precision of a physical law, but represents practical working limits with a reasonable degree of approximation. Curve 1 in the drawing illustrates the equation. It will be seen that at 200° F. the extraction should not last more than 2 hours and at 100° F., not more than 5 hours; at 60° F., 16 hours should not be exceeded. Extraction can, however, be carried out in shorter times than these and in general better quality is secured with extractions of lesser duration than these maxima.

The extract, if not evaporated immediately, may be stored for as long as 16 hours at 40° F. without serious deterioration, but this storage is to be avoided if possible. Under an atmosphere of inert gas, such as $CO_2$ or $N_2$, or with the addition of an effective non-toxic antioxidant such as tocopherols, the temperature of storage for 16 hours may range as high as 75° F.

This storage period is as critical as or even more critical than the extraction period. Best practice requires immediate evaporation to ensure consistent production of material of optimum quality. Nevertheless highly satisfactory products may be obtained if certain precautions are observed.

The time between completion of extraction and evaporation of a low-temperature extract, whether from a batch or continuous extraction, should preferably be not longer than 2 hours at 70° F. and in any case not much longer than 4 hours at 70° F., under ordinary conditions. If special precautions to inhibit deterioration are observed, such as storage of the extract in an inert atmosphere or with added non-toxic antioxidant, the extract may be stored a considerably longer time without becoming unusable.

The relation of permissible times of storage to storage temperatures may be expressed by hyperbolic equations with close approximation, but, as pointed out above, in view of the natural variability of raw coffee these equations do not have the precision of established physical laws.

If $x$ represents the maximum storage time in hours and $y$ the storage temperature in degrees F., the preferred limits are given by the equation $$xy - 35x + 0.5y = 106 \qquad (2)$$

However, by observing the following conditions in the absence of special precautions to avoid decomposition, $$xy - 33x + y = 225 \qquad (3)$$

reasonably good results may be obtained. If the extract is stored under an inert gas or if a non-toxic antioxidant is added in an effective amount, storage time may be extended as indicated by the equation $$xy - 45x + y = 500 \qquad (4)$$

In no case is storage advisable for more than 16 hours.

Equation 2 is represented by curve 2 in the drawing, Equation 3 by curve 3, and Equation 4 by curve 4.

The deterioration of the low-temperature extract which occurs if the above conditions are not observed, appears to be, in part at least, an enzymatic fermentation, and its onset is usually characterized by incipient effervescence.

The high-temperature extraction of my process, when employed, may be carried out in a range of temperatures from 212° F. up to about 300° F. or somewhat above, e. g. to 325° F. This extraction is preferably applied to the partially extracted coffee resulting from the low temperature stage, but in one modification of my invention it may be applied to fresh ground raw coffee. In either case the extract is further worked up as described below.

While various types and lots of coffee yield different amounts of solid concentrate under like conditions, the following table shows how yields from a representative coffee vary with the temperature in the high-temperature stage in my invention. The percentage figures represent total yield of solid concentrate from typical extractions, based on the weight of green coffee used.

TABLE

| Temperature | Gage pressure, lb. per sq. in. | Yield from green bean, percent |
|---|---|---|
| 212° F | Atmospheric | 23 |
| 250° F | 21 | 24.2 |
| 275° F | 35 | 28.8 |
| 300° F | 62 | 36.8 |
| 325° F | 100 | 37.6 |
| 350° F | 150 | [1] 26.6 |

[1] Charring.

In both stages of batch extraction, the extract may be separated from the grounds by vacuum, pressure filtration, gravity filtration or by pressing the grounds. In general I prefer pressure filtration, as in a filter press or centrifuge. In a continuous countercurrent extraction, such as that mentioned above, pressure filtration or pressing of the exhausted grounds is usually unnecessary, since the small amount of liquor remaining in the exhausted grounds at the high-temperature or entrance end of the system is not rich enough to warrant recovery.

After each extraction is complete I evaporate the extract to dryness as promptly and rapidly as practicable. In the case of batch extractions, I prefer to evaporate the low- and high-temperature extracts separately. Since, however, the high-temperature extract is less liable to deleterious decomposition than the low-temperature extract, the high-temperature extract of one batch may be stored until the low-temperature extraction of a second batch is completed, and the two extracts blended before evaporation.

In the continuous countercurrent extraction mentioned above, only one extract is produced, since cooled high-temperature extract is used for the low-temperature extraction of fresh green coffee at the exit end of the system, and this contains the entire solubles yield of the coffee treated. This is evaporated preferably rapidly and at once after the completion of the extraction, or alternatively with the precautions outlined above to avoid deleterious decomposition, e. g. refrigeration.

As pointed out above, in the low-temperature extraction step in the range 60°–212° F. the contact of green coffee and extract should not be longer than 2 hours in the upper part of the range and may be longer in the lower part of the range. In a continuous countercurrent system in which the extraction is carried out in a series of closed percolators substantially free of air and in which the temperature drops from, say, around 300° F., at the end where water comes into contact with nearly exhausted coffee, to 60° F. at the end where extract leaves fresh raw coffee, the time of contact will be the same in each percolator if the percolators have a uniform cross-section, as is usually the case. Accordingly the duration of contact will be controlled by the cold end of the train where conditions similar to those applicable to batch evaporation must be observed. The sensitivity of the extract to decomposition increases in passing through the train as its temperature drops below 212° F. and as it comes into contact with fresher and fresher (i. e. less extracted) raw coffee. The relations are somewhat complicated here by the additional variable, the degree of exhaustion of the coffee in the different stages, but in general it is preferable not to exceed a time of 2 hours in each percolator.

The evaporation of the extracts, whether separate or combined, may be carried out in numerous ways, the chief requirement being avoidance of exposure of the extract to high temperatures for an extended time. While some types of vacuum evaporation are feasible, I prefer to use either a spray drier, in which the time of evaporation may be less than 1 second, or an external atmospheric drum drier in which the time of drying may be a few seconds.

The residues of evaporation of the low- and high-temperature extracts are free flowing granular powders having a greenish or brownish cast with a characteristic green coffee odor and taste, and a moisture content of less than 3%. Using the preferred method of drying, i. e. spray drying, a product of uniform particles is obtained which lends itself to uniform roasting. This material is further treated to prepare a soluble concentrate suitable for making beverage coffee by roasting. Conditions similar to those used in conventional coffee roasting may be employed. Because, however, of the nature of the material, optimum roasting times and temperatures will vary much more with variations in conditions than is the case with coffee beans. Among such variable conditions are: amount of material, depth of layer, method of heating, air circulation and the like. With small amounts of material, without forced air circulation, good results have been obtained, for example, with temperatures in the neighborhood of 410° F. for 15–17 minutes.

When the evaporation residues of my invention are roasted, they go through a plastic stage and at the same time they foam; as the roasting proceeds, the material solidifies but retains its foam structure. The result is that the roasted product is a friable porous mass which may be readily pulverized. This roasted product is completely soluble in cold or hot water and in proper concentration yields a beverage having all the attributes of a beverage freshly brewed from fresh roasted coffee.

Examples of embodiments of my process follow. They are intended to be illustrative only, and not to limit my invention, the scope of which is defined in the appended claims.

*Example 1*

Raw coffee beans are ground to a fineness such that 100% passes a 3 mm. screen and 75% is retained by a 0.5 mm. screen.

200 pounds of ground raw coffee is placed in a covered jacketed kettle provided with an agitator and 100 gallons of water introduced at a temperature of 200° F. The air in the kettle is displaced with $CO_2$ and the contents of the kettle are slowly agitated for 1½ hours, while the temperature in the kettle is maintained at 190° to 210° F.

When the extraction is complete, the contents of the kettle are transferred to a centrifuge, and the filtrate collected without washing the filter cake.

The filtrate is then immediately spray-dried to a moisture content of approximately 2½%.

The filter cake is transferred again to the kettle, the kettle charged with hot water, and the contents raised to about 300° F. or slightly higher, but not over 325° F. Air is bled from the kettle so that the extraction takes place under a blanket of steam at about 60–100 lb. per sq. in. gage pressure. The extraction is continued for 1 hour with slow agitation, after which the contents of the kettle are discharged and filtered. The filtrate is immediately spray-dried.

The combined residues of the spray-drying operations are thoroughly mixed, spread in thin layers on trays and roasted in an oven with air circulation for 15–17 minutes at 390°–410° F. The porous friable dark brown product is comminuted to suitable size and packaged. For long-term storage it may be packaged under vacuum or in an atmosphere of $CO_2$ or $N_2$.

*Example 2*

One hundred pounds of green coffee beans and 400 pounds water (48 gallons) at 70° F. are fed into a mill, such as a Fitzpatrick mill, operating at 7000 R. P. M. and having a ³⁄₁₆″ round mesh screen, and ground to a fine pulp. There is little or no temperature rise. The pulp is centrifuged, a filtrate being obtained containing coffee solubles amounting to approximately 30% of the weight of the green coffee. This filtrate is then spray-dried at an inlet air temperature of 500° F. and an outlet temperature of 240° F. to a moisture content of 2½%, the drying being nearly instantaneous. The resulting residue is roasted and ground to a uniform particle size. Dissolved in water, this product produced a beverage of fine aroma and full bodied coffee flavor.

*Example 3*

Twenty parts by weight of the solid soluble concentrate produced in Example 2 is homogeneously mixed with 80 parts by weight of a high-grade commercial soluble coffee concentrate made by the high-temperature extraction of roasted coffee. The two products are compatible, and the aroma and flavor are superior to that of the commercial product alone.

*Example 4*

Water under pressure at a temperature of 285° F. is pumped into one end of a train of nine percolators connected in series. The percolator at the outlet or cool end of the train contains a charge of 1000 pounds of high-grade fresh ground raw coffee and the other percolators contain corresponding amounts of coffee progressively depleted in solubles towards the inlet or hot end. The water is pumped through the train at the rate of 320 gallons per hour. The temperature in the three percolators at the hot end is maintained at about 285° F. by means of heat exchangers between the percolators, and the temperature of the extract as it passes through the other percolators to the outlet end is lowered gradually to 70° F.

The train is operated on a 1½ hour cycle. After 1½ hours of circulation, i. e. after 480 gallons (4000 pounds) of water has passed through the train, the coffee in the percolator at the hot end is exhausted; that percolator is cut out of the train and emptied while simultaneously a percolator charged with fresh ground raw coffee is shunted in at the cold end of the train. A train of 9 percolators in circuit and two standby percolators (one for charging and one for cleaning and servicing) can be operated indefinitely by repetition of this cycle. This process thus constitutes a continuous countercurrent extraction process in which continuously more depleted coffee is moved stepwise against a stream of extract of continuously increasing concentration.

A larger or smaller number of percolators may be used, and the design, piping connections, and installation of auxiliary equipment may be varied widely, as will be well understood by those familiar with this art.

The effluent from the cold end of the train is run into a receiving tank at a temperature of approximately 70° F. From the tank it is run to a spray-drier (first through a clarifying filter if necessary) and rapidly dried to a fine uniform greenish brown powder containing less than 3% moisture. The receiving tank represents a safety factor to provide for possible lack of coordination of extraction-train and spray-drier operation. Under normal operating conditions the effluent will remain in the tank an exceedingly short time, or the tank may be by-passed entirely. In any case, storage in the tank at 70°–75° F. should not exceed 2 hours.

The powder from the spray drier is roasted as disclosed above, ground and packaged.

The products of my invention are solid soluble coffee concentrates which, dissolved in water in an amount to suit the individual taste, furnish a coffee beverage of superior body and aroma, closely duplicating a coffee beverage properly brewed in the conventional way from freshly roasted and ground high-grade coffee. As will be understood from this disclosure by those skilled in the art, my invention comprises variations and modifications within the scope of the following claims.

I claim:
1. In a process of preparing a soluble solid coffee extract by extracting unroasted coffee with an aqueous medium at not above 212° F., separating and spray-drying the extract, and roasting the residue at a coffee-roasting temperature, the improvement which comprises: carrying out the extraction while simultaneously grinding the unroasted coffee in the extractive medium, separating and spray-drying the extract and roasting the residue at a coffee-roasting temperature, limiting the time and temperature of simultaneous extraction and grinding to 2 to 16 hours at 212° to 60° F. and limiting the time and temperature of holding the separated extract before drying to 0 to 16 hours at 212° to 40° F., the longer times being for the lower temperatures and the shorter times for the higher temperatures, whereby deleterious decomposition of the green extract is avoided.

2. In a process of preparing a soluble solid coffee extract by extracting ground unroasted coffee at not above 212° F., separating and spray-drying the extract, and roasting the residue at a coffee-roasting temperature, the improvement which comprises: utilizing as the extracting medium for the ground unroasted coffee at not above 212° F. an extract obtained by extracting partially exhausted ground coffee with water in the temperature range 212°–325° F., limiting the time and temperature of extraction at not above 212° F. to 2 to 16 hours at 212° to 60° F., and limiting the time and temperature of holding the separated extract before drying to 0 to 16 hours at 212° to 40° F., the longer times being for the lower temperatures and the shorter times for the higher temperatures, whereby deleterious decomposition of the green extract is avoided.

References Cited in the file of this patent
UNITED STATES PATENTS

| | | |
|---|---|---|
| 1,932,769 | Copes et al. | Oct. 31, 1933 |
| 1,933,049 | Copes | Oct. 31, 1933 |
| 2,149,876 | Wendt et al. | Mar. 7, 1939 |
| 2,515,730 | Ornfelt | July 18, 1950 |